F. GARDNER.
Seed-Drill Teeth.
No. 102,531.
Patented May 3, 1870.
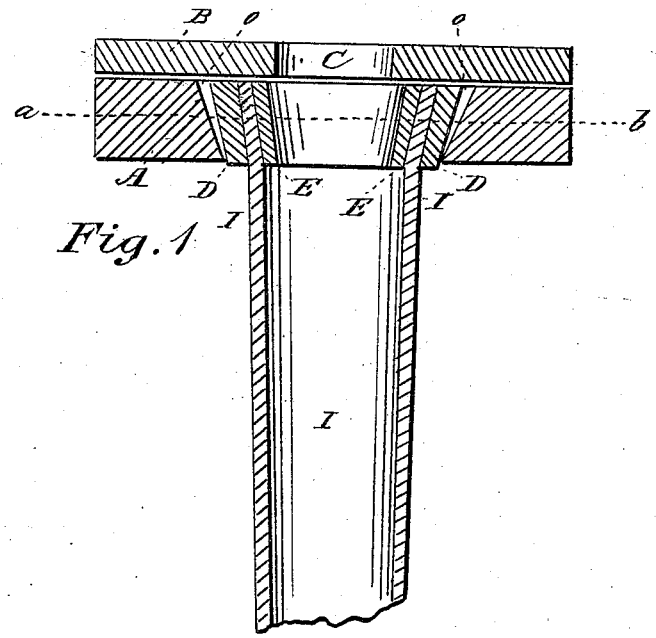
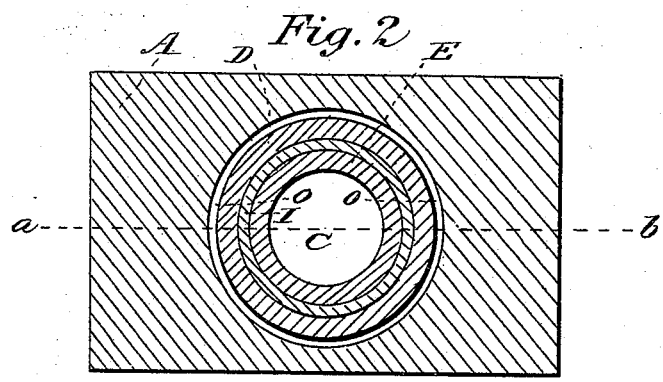
Witnesses:
C. L. Lochman
A. L. Spenster
Inventor:
Franklin Gardner

United States Patent Office.

FRANKLIN GARDNER, OF CARLISLE, PENNSYLVANIA.

Letters Patent No. 102,531, dated May 3, 1870; antedated April 18, 1870.

---

IMPROVEMENT IN FASTENING TUBES IN GRAIN-DRILLS.

---

The Schedule referred to in these Letters Patent and making part of the same.

---

I, FRANKLIN GARDNER, of Carlisle, in the county of Cumberland and State of Pennsylvania, have invented certain Improvements in the Mode of Fastening Tubes in a Grain-Drill, of which the following is a specification.

My invention consists in the manner of fastening gum tubes to the tube-board of a grain-drill in a simple, durable, and more perfect manner than has been done heretofore.

The top of the tube, into which the grain drops, is firmly clasped between double beveled washers, one fitting into the other, with the mouth of the tube wedged between them. The outer washer, on the outside, tapers from the top downward, and is suspended, with its accompanying tube, in a tapered hole of the lower tube-board.

By this manner of hanging the tube it is not so easily torn away as when it is nailed to its place, and it also has sufficient play in the tube-board, in the manner of a ball-and-socket joint, to enable the tubes to be placed in two rows at their lower, or bottom, ends, by hanging them backward and forward, alternately, and thus forming two rows at a convenient distance apart. Such arrangement is desirable for certain kinds of land.

Figure 1 is a vertical section of the device embodying my invention.

Figure 2 is a transverse section, looking down on the top, when cut by the line $a\ b$, drawn across fig. 1.

A is the lower tube-board, with the beveled hole $o\ o$.

B is the upper tube-board, with the feeding-hole C.

This board prevents the loosely-suspended tube from being disengaged from the lower tube-board.

D and E are the tapering or beveled washers.

I is the gum tube, the mouth of which is held by the washers D and E.

The washers are made of cast-iron, or may be made of any other suitable metal.

Claim.

I claim as my invention—

1. The double-beveled washers D and E, in combination with the mouth of a tube of a grain-drill, as specified.

2. The combination of the tube, with its washers, with the tube-board of a grain-drill, substantially as and for the purpose set forth.

FRANKLIN GARDNER.

Witnesses:
C. L. LOCHMAN,
A. L. SPONSLER.